US012808663B2

(12) United States Patent
Yamazaki

(10) Patent No.: US 12,808,663 B2
(45) Date of Patent: Nov. 24, 2026

(54) INFORMATION PROCESSING APPARATUS AND CORRECTION METHOD

(71) Applicant: Tokyo Electron Limited, Tokyo (JP)

(72) Inventor: Shota Yamazaki, Tokyo (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 293 days.

(21) Appl. No.: 18/612,938

(22) Filed: Mar. 21, 2024

(65) Prior Publication Data

US 2024/0328782 A1 Oct. 3, 2024

(30) Foreign Application Priority Data

Mar. 28, 2023 (JP) ................................ 2023-052012

(51) Int. Cl.
*G01B 21/08* (2006.01)

(52) U.S. Cl.
CPC .................................... *G01B 21/08* (2013.01)

(58) Field of Classification Search
CPC ...................................................... G01B 21/08
USPC ......................................................... 73/865.8
See application file for complete search history.

(56) References Cited

U.S. PATENT DOCUMENTS

2007/0209926 A1* 9/2007 Lee ....................... C23C 14/352 204/192.1
2021/0020479 A1* 1/2021 Kang .................. H10P 72/0604

FOREIGN PATENT DOCUMENTS

JP 2008-091826 A 4/2008

* cited by examiner

*Primary Examiner* — Nathaniel T Woodward
(74) *Attorney, Agent, or Firm* — Venjuris, P.C.

(57) ABSTRACT

An information processing apparatus includes an input unit that inputs positional information regarding a plurality of measurement points on a substrate and a plurality of measured values indicating a substrate processing result at each of the plurality of measurement points, a calculation unit that calculates a plurality of estimated values for the substrate processing result at each of the plurality of measurement points selected from the input positional information regarding the plurality of measurement points using a local linear regression method, a determination unit that determines, as an outlier, the measured value at the measurement point where an absolute value of a difference between the measured value and the estimated value at each of the plurality of selected measurement points deviates from a preset threshold, and a correction unit that corrects the measured value at the measurement point determined as the outlier.

9 Claims, 7 Drawing Sheets

INFORMATION PROCESSING APPARATUS AND CORRECTION METHOD

CROSS-REFERENCE TO RELATED APPLICATIONS

The present application is based on and claims priority from Japanese Patent Application No. 2023-052012, filed on Mar. 28, 2023, with the Japan Patent Office, the disclosure of which is incorporated herein in its entirety by reference.

TECHNICAL FIELD

The present disclosure relates to an information processing apparatus and a correction method.

BACKGROUND

A substrate processing apparatus performs a substrate processing on a substrate such as film formation and etching on a substrate. The results of substrate processing such as the thickness of a film formed on the substrate are measured by a measuring device such as a film thickness gauge. The measured values are used to optimize a recipe that defines process conditions during the substrate processing. For example, Japanese Patent Laid-open Publication No. 2008-091826 proposes a technique to detect a singularity from the measured results of the thickness of a film formed on a substrate and correcting the measured results of the film thickness of the singularity.

SUMMARY

According to one aspect of the present disclosure, an information processing apparatus includes an input unit that inputs positional information regarding a plurality of measurement points on a substrate and a plurality of measured values indicating a substrate processing result at each of the plurality of measurement points, a calculation unit that calculates a plurality of estimated values for the substrate processing result at each of the plurality of measurement points selected from the positional information regarding the plurality of measurement points using a local linear regression method, a determination unit that determines, as an outlier, a measured value at a measurement point where an absolute value of a difference between the measured value and the estimated value at each of the plurality of selected measurement points deviates from a threshold set in advance, and a correction unit that corrects the measured value at the measurement point determined as the outlier.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
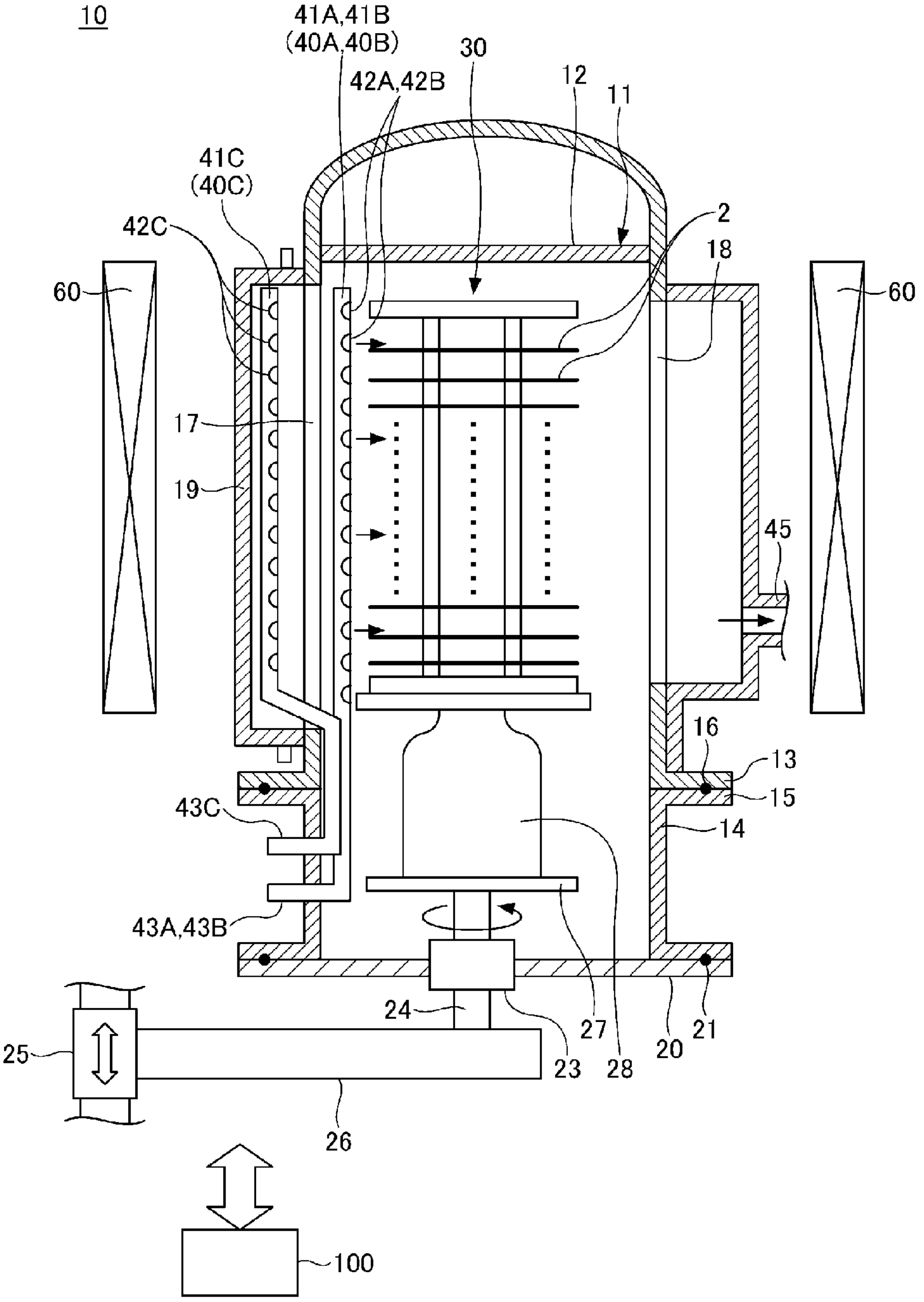
FIG. 1 is a cross-sectional schematic diagram illustrating an example of a substrate processing apparatus according to an embodiment.

The foregoing summary is illustrative only and is not intended to be in any way limiting. In addition to the illustrative aspects, embodiments, and features described above, further aspects, embodiments, and features will become apparent by reference to the drawings and the following detailed description.

Hereinafter, embodiments for carrying out the present disclosure will be described with reference to the drawings. In each drawing, the same reference numerals may be given to the same components, and redundant descriptions may be omitted.

Substrate Processing Apparatus

First, a substrate processing apparatus 10 according to an embodiment will be described with reference to FIG. 1. FIG. 1 is a diagram illustrating the substrate processing apparatus 10 according to the embodiment. The substrate processing apparatus 10 accommodates a plurality of wafers 2 in a processing container 11 and forms a film on the plurality of wafers.

The substrate processing apparatus 10 is a batch type vertical heat treatment apparatus that processes the plurality of wafers 2. However, the substrate processing apparatus 10 is not limited to the batch type heat treatment apparatus. For example, the substrate processing apparatus 10 may be a single wafer type apparatus that processes wafers one by one. Further, the substrate processing apparatus 10 may be a semi-batch type apparatus that processes several substrates simultaneously. In the semi-batch type apparatus, a plurality of wafers arranged around the rotation centerline of a rotary table may be rotated along with the rotary table to sequentially pass through a plurality of areas to which different gases are supplied. Further, the substrate processing apparatus 10 is not limited to a film forming apparatus but may be any apparatus capable of processing a substrate such as an etching apparatus or a sputtering apparatus.

The substrate processing apparatus 10 includes a processing container 11 that accommodates the wafers 2 and forms a space therein where the wafers 2 are processed, a lid 20 that airtightly closes an opening at a lower end of the processing container 11, and a substrate holder 30 that holds the wafers 2. The wafers 2 are, for example, semiconductor substrates (simply also referred to as substrates), and more specifically, for example, silicon wafers. The substrate holder 30 is also referred to as a wafer boat.

The processing container 11 includes a cylindrical processing container main body 12 with an open lower end and a ceiling. The processing container main body 12 is made of, for example, quartz. A flange 13 is formed at the lower end of the processing container main body 12. Further, the processing container 11 includes, for example, a cylindrical manifold 14. The manifold 14 is made of, for example, stainless steel. A flange 15 is formed at an upper end of the manifold 14, and the flange 13 of the processing container main body 12 is installed to the flange 15. A seal member 16 such as an O-ring is interposed between the flange 15 and the flange 13.

The lid 20 is airtightly mounted to an opening at a lower end of the manifold 14 via a seal member 21 such as an O-ring. The lid 20 is made of, for example, stainless steel. A through-hole is formed in the center of the lid 20 to penetrate the lid 20 in the vertical direction. A rotating shaft 24 is positioned in the through-hole. A gap between the lid 20 and the rotating shaft 24 is sealed by a magnetic fluid seal 23. A lower end of the rotating shaft 24 is rotatably supported by an arm 26 of an elevator 25. A rotating plate 27 is provided at an upper end of the rotating shaft 24. The substrate holder 30 is installed on the rotating plate 27 via a heat reservoir 28.

The substrate holder 30 holds the plurality of wafers 2 at intervals in the vertical direction. Each of the plurality of wafers 2 is held horizontally. The substrate holder 30 is made of, for example, quartz ($SiO_2$) or silicon carbide (SiC). When raising the elevator 25, the lid 20 and the substrate holder 30 are raised, thus loading the substrate holder 30 to the inside of the processing container 11 and sealing the opening at the lower end of the processing container 11 with the lid 20. Further, when lowering the elevator 25, the lid 20 and the substrate holder 30 are lowered, thus unloading the substrate holder 30 to the outside of the processing container 11. Further, rotating the rotating shaft 24 causes the substrate holder 30 to rotate along with the rotating plate 27.

The substrate processing apparatus 10 includes three gas supply pipes 40A, 40B and 40C. The gas supply pipes 40A, 40B and 40C are made of, for example, quartz ($SiO_2$). The gas supply pipes 40A, 40B and 40C supply gases to the inside of the processing container 11. The types of gases will be described later. One gas supply pipe may sequentially discharge one type of gas or multiple types of gases. Further, a plurality of gas supply pipes may discharge the same type of gas.

The gas supply pipes 40A, 40B and 40C include horizontal pipes 43A, 43B and 43C that horizontally penetrate the manifold 14 and vertical pipes 41A, 41B and 41C arranged vertically in the inside of the processing container 11. The vertical pipes 41A, 41B and 41C have a plurality of supply ports 42A, 42B and 42C at intervals in the vertical direction. Various gases supplied to the horizontal pipes 43A, 43B and 43C are directed to the vertical pipes 41A, 41B and 41C and are discharged horizontally from the plurality of supply ports 42A, 42B and 42C. The vertical pipe 41C is arranged inside a plasma box 19. The vertical pipes 41A and 41B are arranged inside the processing container 11.

The substrate processing apparatus 10 includes an exhaust pipe 45. The exhaust pipe 45 is connected to an exhaust device (not illustrated). The exhaust device includes a vacuum pump and serves to exhaust the inside of the processing container 11. To exhaust the inside of the processing container 11, an exhaust port 18 is formed in the processing container main body 12. The exhaust port 18 is oriented to face the supply ports 42A, 42B and 42C. The gases discharged horizontally from the supply ports 42A, 42B and 42C pass through the exhaust port 18 and are then discharged from the exhaust pipe 45. The exhaust device sucks the gases from the inside of the processing container 11 and directs them to a pollution control device. The pollution control device removes harmful components of the exhaust gas before releasing it into the atmosphere.

The substrate processing apparatus 10 further includes a heating unit 60. The heating unit 60 is arranged at the outside of the processing container 11 and heats the inside of the processing container 11 from the outside of the processing container 11. For example, the heating unit 60 is formed in a cylindrical shape to surround the processing container main body 12. The heating unit 60 is configured with, for example, an electric heater. The heating unit 60 heats the inside of the processing container 11, thereby enhancing the processing capability of gases supplied into the processing container 11.

An opening 17 is formed in a circumferential portion of the processing container main body 12. The plasma box 19 is formed on the lateral side of the processing container 11 to surround the opening 17. The plasma box 19 is formed to protrude radially outward from the processing container main body 12, and for example, has a U-shape when viewed in the vertical direction.

Two electrode pairs are arranged to sandwich the plasma box 19 therebetween. Each electrode pair includes a pair of parallel electrodes facing each other provided at the outside of the plasma box 19. Similar to the vertical pipe 41C, the electrode pairs are elongated in the vertical direction to face each other. The electrode pairs are connected to an RF power supply via a matcher to receive a radio frequency voltage applied from the RF power supply.

As illustrated in FIG. 1, the substrate processing apparatus 10 includes a control device 100. The control device 100 processes computer-executable instructions that cause the substrate processing apparatus 10 to execute various substrate processing processes. The control device 100 may be configured to control each element of the substrate processing apparatus 10 so as to execute various substrate processing processes. In one embodiment, a part or the entirety of the control device 100 may be included in the substrate processing apparatus 10. The control device 100 may include a processor, a storage, and a communication interface. The control device 100 is implemented by, for example, a computer. The processor may be configured to perform various control operations by reading recipes and programs from the storage and executing the read recipes and programs. The recipes and programs may be stored in advance in the storage, or may be acquired via a medium when necessary. The medium may be any of various computer-readable storage media, or may be a communication line connected to the communication interface. The processor may be a CPU. The storage may be a RAM, ROM, HDD, etc. The communication interface may communicate with the substrate processing apparatus 10 or an information processing apparatus 200 (see FIG. 2) through a communication network such as a LAN.

Information Processing System

Figure 2:
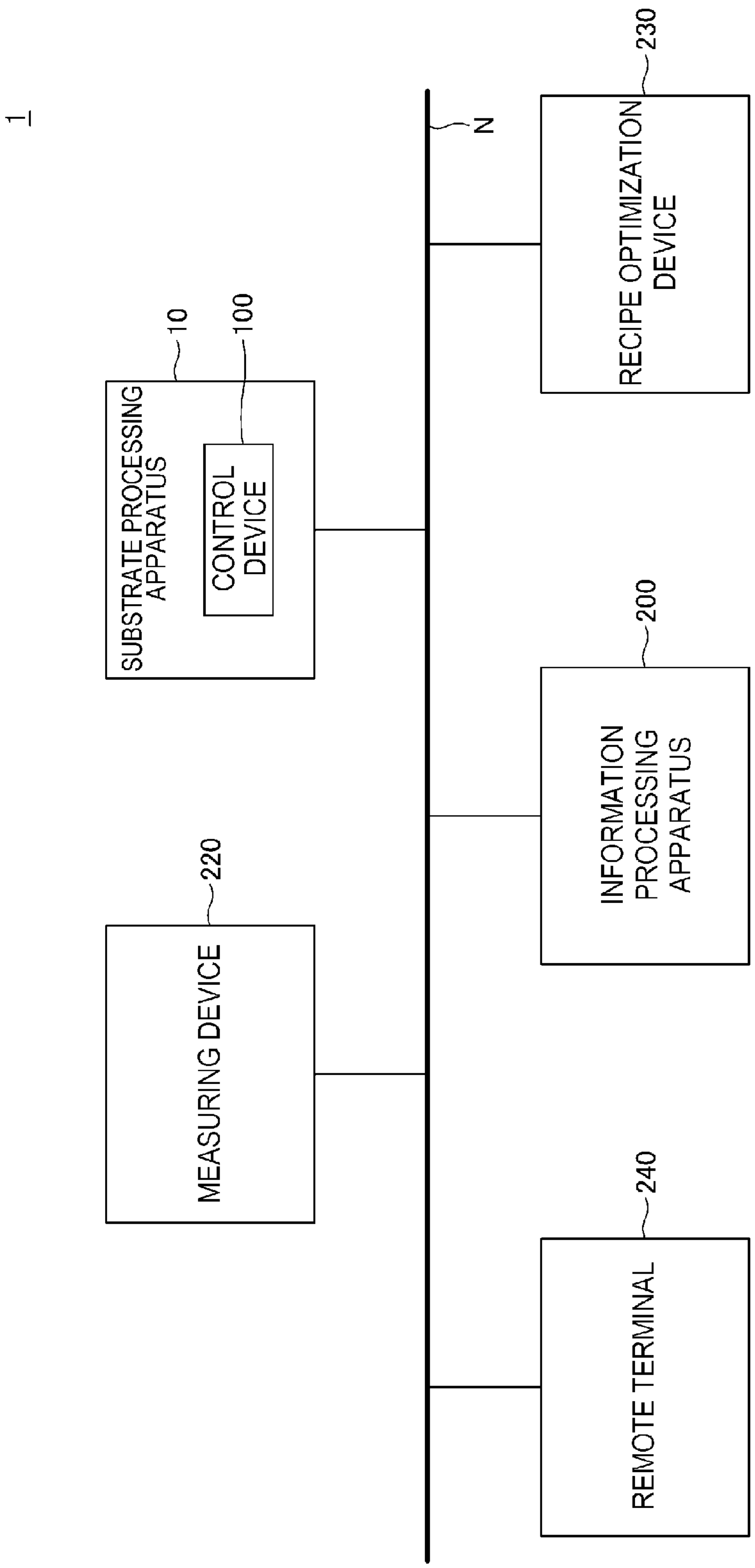
FIG. 2 is a diagram illustrating an example of a configuration of an information processing system according to an embodiment.

Next, an information processing system 1 will be described with reference to FIG. 2. FIG. 2 is a diagram illustrating an example of a configuration of the information processing system 1 according to an embodiment. The information processing system 1 includes the substrate processing apparatus 10, the information processing apparatus 200, a measuring device 220, a recipe optimization device 230, and a remote terminal 240, and these are connected for data communication through a communication network N such as the Internet or LAN. As described with reference to FIG. 1, the substrate processing apparatus 10 loads the substrate holder 30, on which the plurality of wafers 2 are placed, into the processing container 11 to perform film formation on the plurality of wafers 2. The measuring device 220 measures the film thickness at a measurement point on a monitor wafer among the wafers 2 that have been subjected to film formation in the substrate processing apparatus 10. A measured film thickness value at the measurement point on the monitor wafer from the measuring device 220 is input to the information processing apparatus 200 automatically or according to the operator's operation. The number and coordinates of measurement points on the monitor wafer are pre-set parameters. Although the value measured by the measuring device 220 is assumed to be a film thickness in the following, but the measured value indicating the results of substrate processing is not limited to the film thickness.

The information processing apparatus 200 calculates an estimated film thickness value, which indicates the film thickness as the results of substrate processing at each measurement point, using a local linear regression method based on the input coordinates of a plurality of measurement points on the monitor wafer and a plurality of measured film thickness values at each of the plurality of measurement points. Then, the information processing apparatus 200 determines outliers (e.g., abnormal or deviated values) in the measured values based on the absolute value of the difference between the measured film thickness value and the estimated film thickness value, and then corrects the measured values at the measurement points determined as outliers.

The information processing apparatus 200 outputs the measured values at the plurality of measurement points including the corrected measured values. The recipe optimization device 230 optimizes a recipe that sets the substrate processing sequence based on the measured values at the plurality of measurement points including the corrected measured values. The optimized recipe is transmitted from the recipe optimization device 230 to the control device 100. The control device 100 controls the substrate processing apparatus 10 based on the optimized recipe. The optimized recipe aids in achieving more precise control of film formation on the wafer 2 by the substrate processing apparatus 10, bringing it closer to target film formation.

When optimizing a recipe for use, the information processing apparatus 200 often inputs the measured values indicating the results of substrate processing such as film thickness. The recipe optimization device 230 takes the input measured values and optimizes recipe settings such as pressure and temperature to bring the results of substrate processing indicated by the measured values closer to target values.

At that time, to perform appropriate recipe optimization, it is important to remove and interpolate outliers included in the input measured values. Outliers refer to measured values that deviate from the allowable value of the results of substrate processing. Conventionally, whether or not the measured values such as film thickness are outliers is determined by visually checking, by a user, the measured values from the measuring device 220. For example, the user may visualize and check the in-plane map of the measured film thickness values at 50 measurement points within the wafer 2 from the measuring device 220, or may check for any measured values with significantly low Goodness-of-Fit (GOF) of film thickness, for the determination of outliers. GOF is an indicator of how well it fits the model of an ellipsometer used for the film thickness measuring device.

As a method of correcting (interpolating) outliers, it is conceivable for the user to perform linear interpolation using the measured values at the measurement points around the identified outliers. However, if the user manually determines whether the measured values are outliers and interpolates them, the user's workload increases as the number of measured values to be checked increases. Further, since there are no objective outlier determination criteria and the user determines outliers based on various determination criteria, the accuracy of removing and interpolating outliers included in the input measured values such as film thickness deteriorates.

Accordingly, the information processing apparatus 200 according to the present embodiment automatically performs the determination of outliers and the interpolation of the measured values determined as outliers without user intervention. The information processing apparatus 200 specifies the objective outlier determination criteria such as numerical values and stores them in advance as parameter settings. This allows for reducing the user's workload and enhancing the accuracy of removal and interpolation of outliers by adopting the objective outlier determination criteria.

Further, input data of the measured values such as film thickness, used by the information processing apparatus 200 for the determination of outliers in the measured values and the removal and interpolation of outliers, only require positional information regarding the measurement points and the measured values such as film thickness at the measurement points, thus having fewer restrictions. Further, the information processing apparatus 200 may perform the determination of outliers in the measured values and the removal and interpolation of outliers regardless of the substrate processing apparatus 10 or process type.

The input data such as the measured film thickness values and the coordinates of the measurement points may be input directly from a device screen of the control device 100, or may be transmitted from the remote terminal 240 or the measuring device 220 to the information processing apparatus 200.

The information processing system in FIG. 2 is merely an example, and the information processing apparatus 200 and the control device 100 may be integrated and built into the substrate processing apparatus 10, or may be provided separately from the substrate processing apparatus 10. Further, the number of each of the substrate processing apparatus 10, information processing apparatus 200, measuring device 220, recipe optimization device 230, and remote terminal 240, which are connected to the communication network N, may not be limited to one, and may be two or more.

Hardware Configuration

Figure 3:
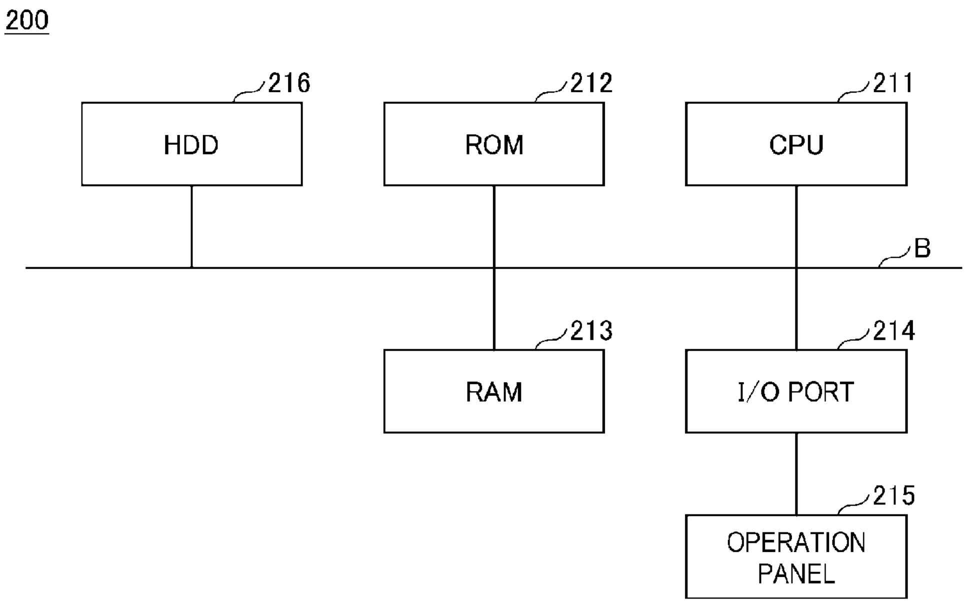
FIG. 3 is a diagram illustrating an example of a hardware configuration of an information processing apparatus according to an embodiment.

The information processing apparatus 200 is implemented by, for example, a computer with a hardware configuration illustrated in FIG. 3. FIG. 3 is a diagram illustrating an example of a hardware configuration of the information processing apparatus 200 according to an embodiment. The information processing apparatus 200 is configured with, for example, a computer and includes a central processing unit (CPU) 211, a read only memory (ROM) 212, and a random access memory (RAM) 213. Further, the information processing apparatus 200 includes an I/O port 214, an operation panel 215, and a hard disk drive (HDD) 216. The respective components are connected via a bus B.

The CPU 211 is an arithmetic unit that reads programs and data from storage device such as the ROM 212 or the HDD 216 onto the RAM 213 and executes a processing to implement the control and functions of the entire information processing apparatus 200.

The ROM 212 is a storage medium composed of an electrically erasable programmable ROM (EEPROM), flash memory, hard disk, etc., and stores programs used by the CPU 211. The RAM 213 functions as, for example, a work area of the CPU 211. The programs used by the CPU 211 include a program for determining outliers and a program for correcting the measured values determined as outliers.

The I/O port 214 acquires the measured values such as film thickness from the measuring device 220 to transmit them to the CPU 211. Further, the I/O port 214 is connected to the operation panel 215 through which the user operates the information processing apparatus 200.

The HDD 216 may be an auxiliary storage device that stores programs, etc. Further, the HDD 216 may store log information of data measured by the measuring device 220.

Function Configuration

Figure 4:
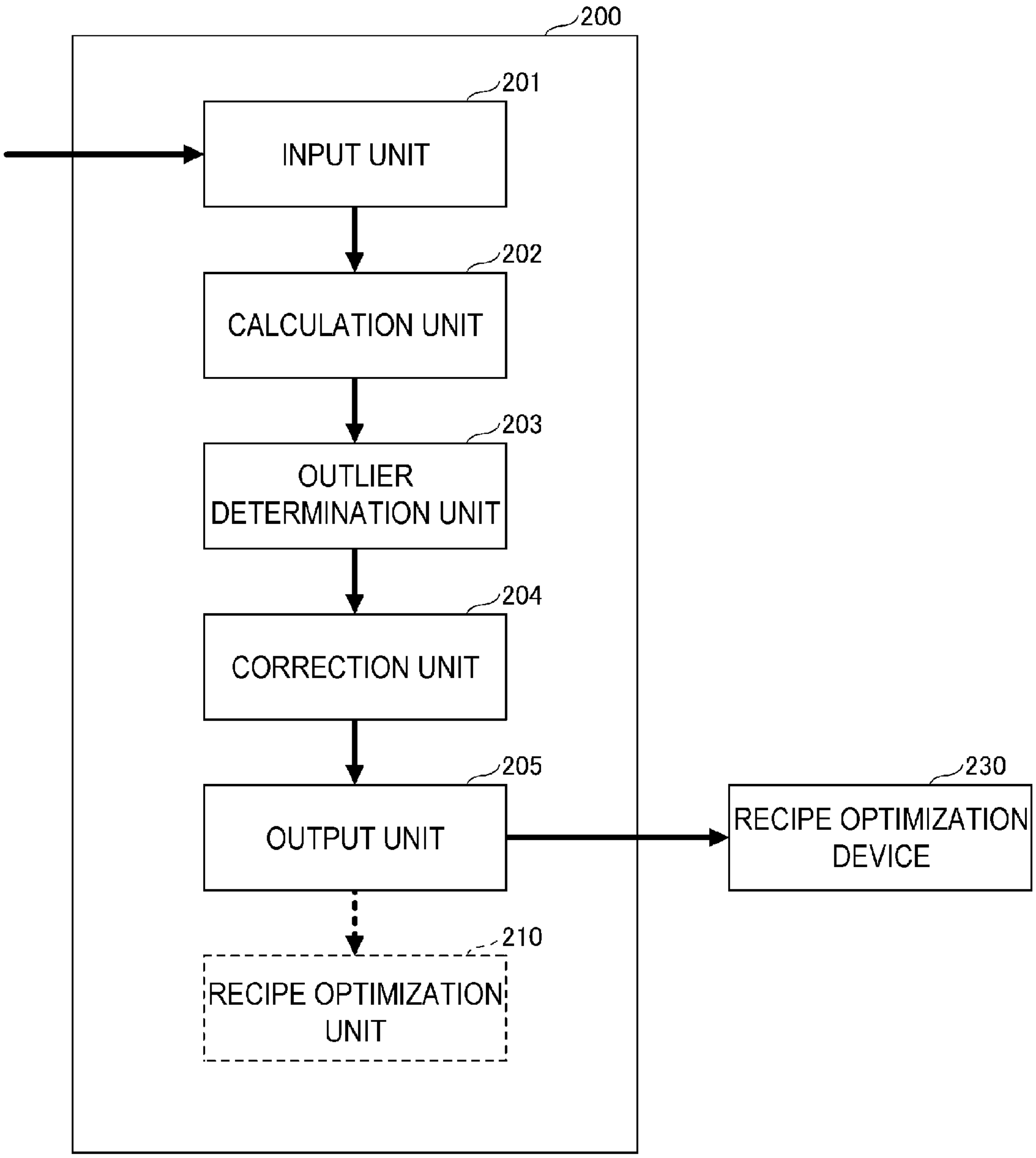
FIG. 4 is a diagram illustrating an example of a functional configuration of the information processing apparatus according to an embodiment.

Next, a functional configuration of the information processing apparatus 200 will be described with reference to FIG. 4. FIG. 4 is a block diagram illustrating an example of a functional configuration of the information processing apparatus 200 according to an embodiment. The information processing apparatus 200 includes an input unit 201, a calculation unit 202, an outlier determination unit 203, a correction unit 204, and an output unit 205. The information processing apparatus 200 may include a recipe optimization unit 210.

The input unit 201 inputs a plurality of measured values indicating positional information regarding a plurality of measurement points on a substrate and the results of substrate processing at each of the plurality of measurement points. Parameters are stored in, for example, the information processing apparatus 200 or the storage of the control device 100. Various parameter settings may be automatically updated to appropriate values but may also be set by the user. Examples of parameter settings may include the number of measurement points used in the local linear regression method, thresholds indicating the outlier determination criteria, and the number of repetitions for a loop processing to be described later. The positional information regarding the measurement points is determined in advance and stored in the information processing apparatus 200 or the storage of the control device 100.

If 50 measurement points are provided on a substrate, the input unit 201 inputs positional information regarding the 50 measurement points and 50 measured values as the results of substrate processing at each measurement point.

The calculation unit 202 selects a specified number of measurement points as parameter settings based on the input positional information regarding the plurality of measurement points, and calculates a plurality of estimated values for the results of substrate processing for each of the selected measurement points using the local linear regression method. In the following, using locally estimated scatterplot smoothing (LOESS) as an example of the local linear regression method will be described by way of example. However, the local linear regression method is not limited to LOESS, and locally weighted scatterplot smoothing (LOWESS) or other local linear regression methods may be used. LOESS uses measured values at a predetermined number of measurement points close to a target measurement point to fit a measured value at the target measurement point to a quadratic curve for data smoothing. LOWESS uses measured values at a predetermined number of measurement points close to a target measurement point to fit a measured value at the target measurement point to a plane for data smoothing. If there are few measurement points, LOWESS may be used instead of LOESS.

The outlier determination unit 203 determines, based on the selected predetermined number of measured values and estimated values, the measured values at the measurement points, where the absolute value of the difference between the measured value and the estimated value at each of the predetermined number of measurement points deviates from a preset threshold, as outliers. The outlier determination unit 203 is an example of a determination unit. The threshold is a preset parameter setting.

The correction unit 204 corrects the measured values at the measurement point determined as outliers. The correction unit 204 may correct the measured values by replacing the measured values at the measurement points determined as outliers with the estimated values at the measurement points.

The calculation unit 202 may recalculate a plurality of estimated values for the results of substrate processing at each of the remaining selected measurement points (a predetermined number of measurement points), excluding the measurement point where the absolute value of the difference between the measured value and the estimated value deviates from the threshold. The outlier determination unit 203 may determine outliers using the absolute value of the difference between the measured value at each of the plurality of selected measurement points and the recalculated estimate value, excluding the measurement points where the absolute value deviates from the threshold. The correction unit 204 may recorrect the measured values at the measurement points determined as outliers.

The calculation unit 202 may repeat the recalculation of the estimated values a preset number of times as parameter settings, and the outlier determination unit 203 may repeat the determination of outliers a preset number of times specified as parameter settings. The calculation unit 202 may repeat the recalculation of the estimated values until there are no measurement points determined as outliers, and the outlier determination unit 203 may repeat the determination of outliers until there are no measurement points determined as outliers.

The output unit 205 outputs positional information regarding the measurement points and the measured values at the plurality of measurement points including the corrected measured values. The output measured values at the plurality of measurement points have been subjected to the removal and interpolation of outliers. These output data are input to the recipe optimization device 230 through the communication network N.

The recipe optimization device 230 optimizes a recipe that sets the substrate processing sequence based on the measured values at the plurality of measurement points including the corrected measured values. The information processing apparatus 200 may include the recipe optimization unit 210, and the recipe optimization unit 210 may optimize the recipe based on the measured values at the plurality of measurement points including the corrected measured values. In this case, the information processing system 1 may not include the recipe optimization device 230.

The control device 100 may have the function of the recipe optimization device 230. In this case, the output data from the output unit 205 is input to the control device 100 through the communication network N, so that the control device 100 optimizes the recipe based on the measured values at the plurality of measurement points including the corrected measured values. The control device 100 controls the substrate processing of the substrate processing apparatus 10 based on the recipe optimized by the recipe optimization device 230, the recipe optimization unit 210, or the control device 100.

The input unit 201 and the output unit 205 are implemented by, for example, the operation panel 215 and the I/O port 214. The calculation unit 202, the outlier determination unit 203, the correction unit 204, and the recipe optimization unit 210 are implemented by, for example, the CPU 211. The information processing apparatus 200 includes a storage (not illustrated), and the storage is implemented by the ROM 212, RAM 213, and HDD 216.

Correction Method

Figure 5:
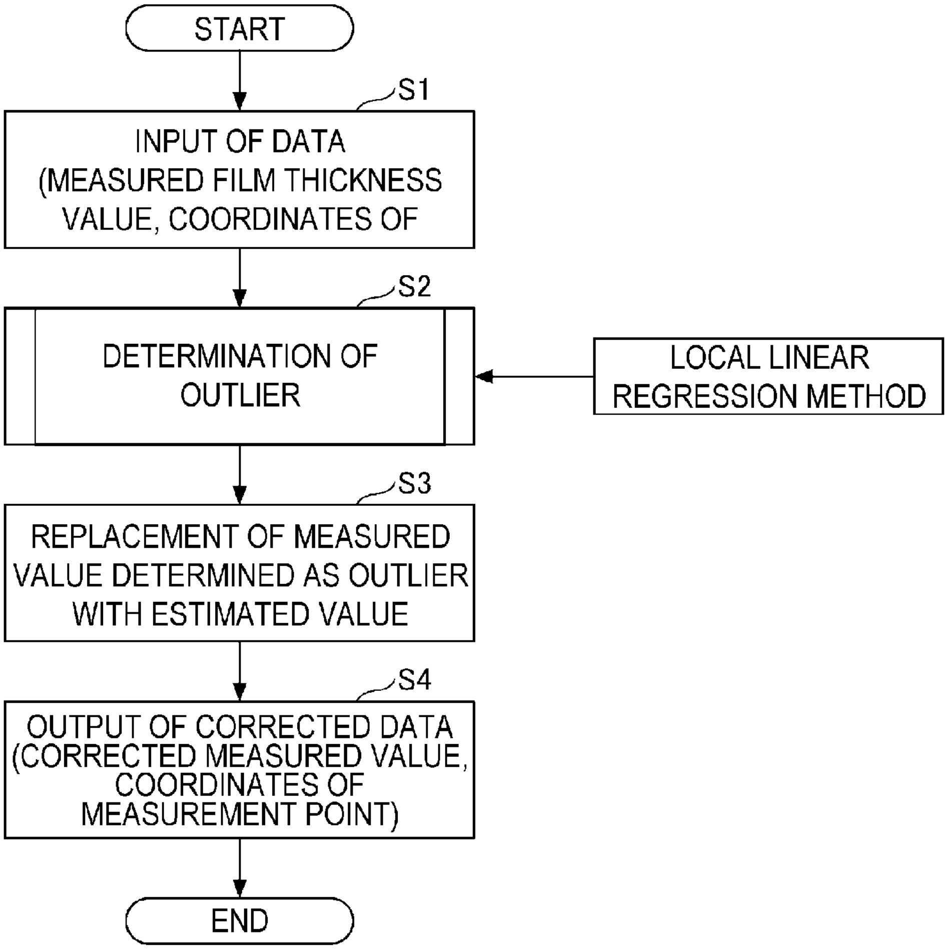
FIG. 5 is a flowchart illustrating an example of a correction method according to an embodiment.
Figure 6:
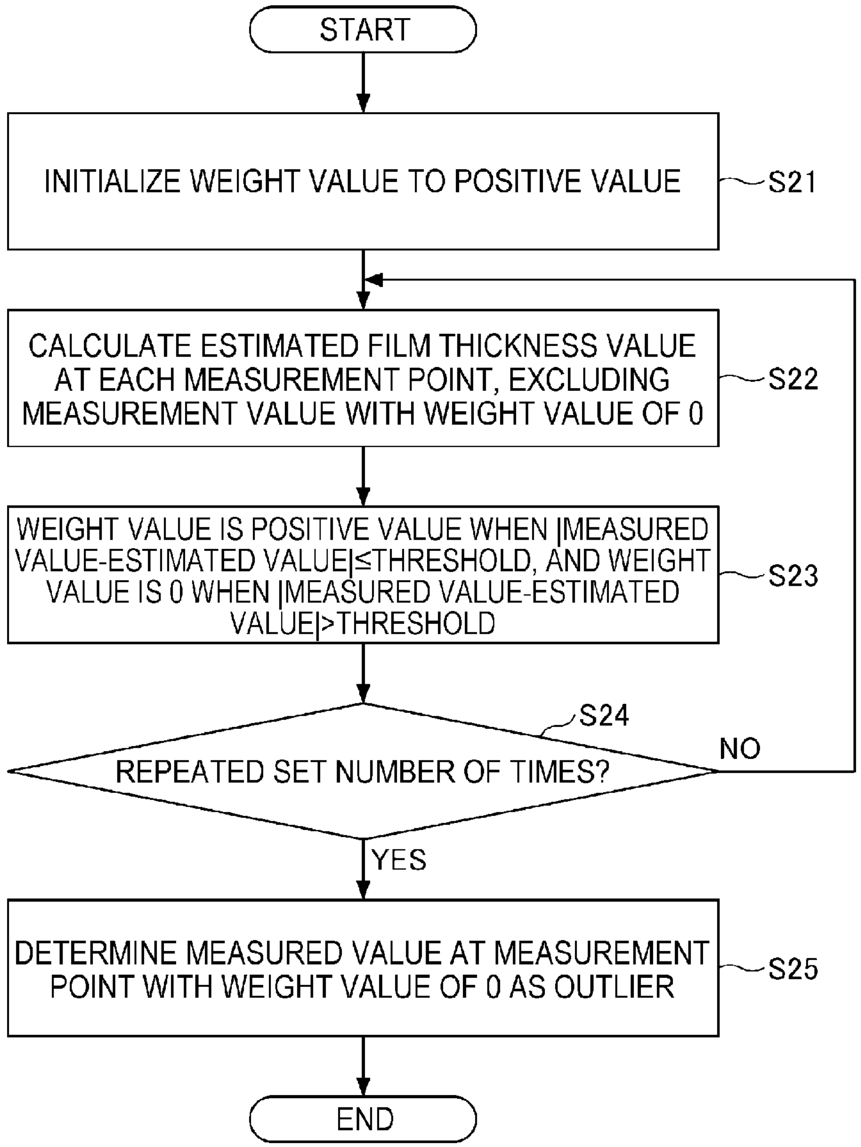
FIG. 6 is a flowchart illustrating an example of an outlier determination method according to an embodiment.

An example of a correction method and an outlier determination method according to an embodiment will be described with reference to FIGS. 5 and 6. FIG. 5 is a flowchart illustrating an example of a correction method according to an embodiment. FIG. 6 is a flowchart illustrating an example of an outlier determination method according to an embodiment. The correction method and the outlier determination method according to the embodiment are executed by the information processing apparatus 200 to perform the determination and interpolation of outliers in the measured values.

In the correction method of FIG. 5, in step S1, the input unit 201 inputs measured values, which are the results of substrate processing, at a plurality of measurement points and positional information regarding the plurality of measurement points. In this example, the input unit 201 inputs measured film thickness values at 50 measurement points as the results of substrate processing at the plurality of measurement points, and inputs the coordinates (X, Y) of the 50 measurement points as the positional information regarding the plurality of measurement points.

Next, in step S2, the outlier determination unit 203 uses the smoothing algorithm of the local linear regression method to determine outliers from the input measured film thickness values at the 50 measurement points. Details of the outlier determination will be described later with reference to FIG. 6.

Next, in step S3, the correction unit 204 corrects the measured values by replacing the measured film thickness values at the measurement points determined as outliers with estimated film thickness values at the measurement points. The calculation of the estimated film thickness value at each measurement point will be described later with reference to FIG. 6.

Next, in step S4, the output unit 205 outputs a plurality of measured values including the corrected measured values at the plurality of measurement points, which are corrected data subjected to the removal and interpolation of outliers, and positional information regarding the plurality of measurement points. In this example, the output unit 205 outputs the measured film thickness values including the corrected measured film thickness values at 50 measurement points as the results of substrate processing after correction at the plurality of measurement points, and outputs the coordinates (X, Y) of the 50 measurement points as the positional information regarding the plurality of measurement points. The output data is used for recipe optimization.

Outlier Determination Method

An outlier determination method will be described with reference to FIG. 6. FIG. 6 is a detailed flowchart illustrating an example of the processing in step S2 of FIG. 5. The number of repetitions (set number) for a loop processing used in the outlier determination method, thresholds indicating the outlier determination criteria, and the number of measurement points used for fitting (smoothing of outliers) including measurement points targeted for smoothing are used as parameter settings. In this example, the number of measurement points used for fitting (smoothing of outliers) is set to 15, but is not limited to this.

First, in step S21, the calculation unit 202 initializes a weight value. There are as many weight values as the number of measurement points, and the calculation unit 202 initializes weight values for all measurement points to positive values. The weight values are used in the determination of outliers. If the weight value is 0, the measured value at that measurement point is determined to be an outlier. If the weight value is a positive value, the measured value at that measurement point is determined not to be an outlier.

Next, in step S22, the calculation unit 202 calculates estimated film thickness values at surrounding 15 measurement points, including measurement points targeted for smoothing, using the local linear regression method. Next, in step S23, the calculation unit 202 calculates the absolute value of the difference between the measured film thickness value and the estimated film thickness value, and compares it with a threshold, which is the outlier determination criterion. When the absolute value of the difference between the measured film thickness value and the estimated film thickness value is less than or equal to the threshold, the weight value for the measurement point becomes a positive value. When the absolute value of the difference between the measured film thickness value and the estimated film thickness value is greater than the threshold, the weight value for the measurement point becomes 0. If the weight value is 0, that measurement point is excluded from the 15 measurement points used for smoothing. Further, in step S25 to be described later, the measured value at the measurement point with the weight value of 0 is excluded since it is an outlier.

Next, in step S24, the calculation unit 202 determines whether or not a loop processing (steps S22 and S23) has been repeated a preset number of times. If it is determined that the loop processing has not been repeated the preset number of times, the calculation unit 202 returns to step S22 and repeats the loop processing of steps S22 and S23.

Returning to step S22, the calculation unit 202 recirculates the estimated film thickness value at each measurement point using the local linear regression method, based on the measured film thickness values at the 15 measurement points, excluding the measurement points with the weight value of 0, selected from the input positional information regarding a plurality of measurement points.

Next, in step S23, when the absolute value of the difference between the measured film thickness value and the recalculated estimated film thickness value is less than or equal to the threshold, the calculation unit 202 sets the weight value for that measurement point to a positive value. When the absolute value of the difference is greater than the threshold, the calculation unit 202 sets the weight value for that measurement point to 0.

By repeating the loop processing of steps S22 and S23, the number of measurement points with the weight value of 0 increases, leading to the exclusion of outliers and an improvement in the accuracy of the measured values. Further, as the number of repetitions of the loop processing increases, the weight value for each measurement point tends to converge to a more appropriate value. Through the exclusion of outliers from the selected 15 measurement points and fitting to a quadratic curve, it is possible to achieve, as the estimated film thickness, the film thickness at the measurement point targeted for smoothing when acquired best fitting results upon completion of the loop processing.

In step S24, if it is determined that the loop processing has been repeated the preset number of times, the calculation unit 202 terminates the loop processing and proceeds to step S25. In the loop processing of steps S22 and S23, all the input measurement points are targeted for smoothing, and quadratic curve fitting is performed for all of the measurement points using the measured values and estimated values at the measurement points targeted for smoothing as well as a predetermined number of measurement points around thereof.

In step S25, the outlier determination unit 203 determines, as outliers, the measured values at the measurement points with the weight value of 0, among all the input measurement points, and terminates this processing.

The correction method including the outlier determination method executed by the information processing apparatus 200 has been described above. This correction method includes inputting positional information regarding a plurality of measurement points on a substrate and measured values indicating substrate processing results at each of the plurality of measurement points, calculating a plurality of estimated values, which indicate the substrate processing results at the plurality of measurement points selected from the input positional information regarding the plurality of measurement points, using a local linear regression method, determining, as outliers, the measured values at the measurement points where the absolute value of the difference between the measured value and the estimated value at each of the plurality of selected measurement points deviates from a preset threshold, and correcting the measured values at the measurement points determined as outliers.

Screen Display Example

Figure 7B:
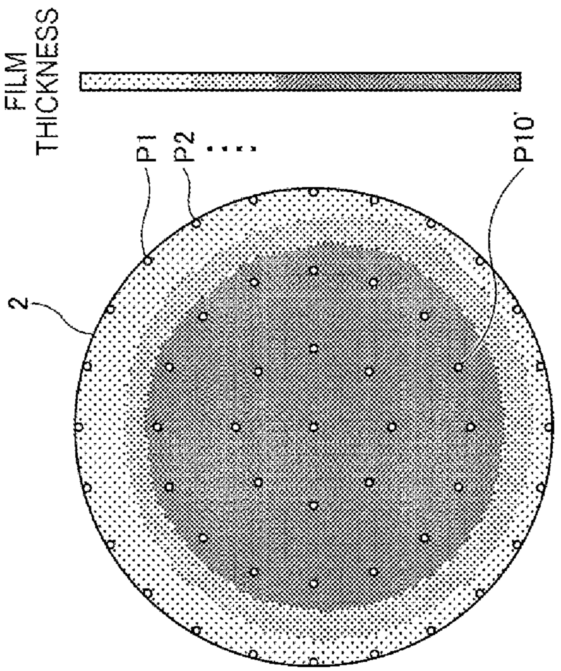
FIGS. 7A and 7B are diagrams illustrating an example of the results of the correction method according to an embodiment.
Figure 7A:
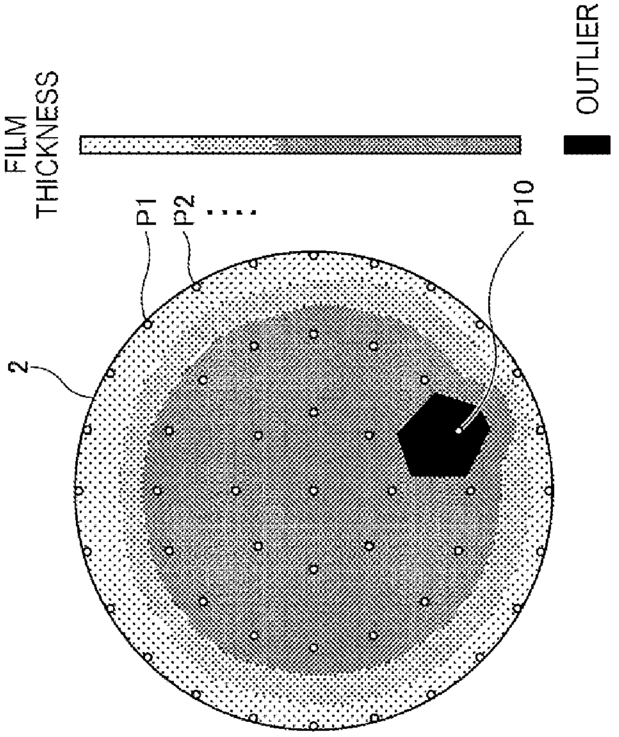

FIGS. 7A and 7B are diagrams illustrating an example of the results of the correction method according to an embodiment. FIG. 7A illustrates the film thickness distribution based on measured values taken at a plurality of measurement points P1, P2, . . . P10 . . . on the wafer 2 before performing the correction method according to the embodiment. The measured value at measurement point P10 in FIG. 7A is considered as an outlier.

FIG. 7B illustrates the film thickness distribution on the wafer 2 after performing the correction method according to the embodiment to exclude and interpolate the measured value at measurement point P10 determined as an outlier, i.e., after replacing the measured value at measurement point P10 with an estimate value.

In FIG. 7B, the outlier at measurement point P10 is excluded, and the film thickness at measurement point P10 is smoothed. The correction method according to the embodiment includes fitting the outlier by measured film thickness values at a plurality of measurement points around the measurement point of the outlier. This allows for a more realistic interpolation for the outlier at measurement point P10.

Images illustrated in FIGS. 7A and 7B may be displayed on for example, a screen of the substrate processing apparatus 10 or the control device 100 to enable user confirmation. In this way, by displaying images that indicate the results before and after the removal and interpolation of outliers, the user may intuitively know, based on the screen display, that, if there is one outlier among a plurality of measurement points, it deviates significantly from the results of the other measurement points. Further, the user may also intuitively know, based on the screen display, that the smoothing target is closer to the results (measured values) of the other measurement points when the outlier is interpolated.

Example of Effects

As described above, the correction method according to the present embodiment allows for the automatic correction of the substrate processing results (measured values) at a plurality of measurement points on a substrate. In other words, the removal and interpolation of outliers in the substrate processing results may be automatically performed using various preset parameter settings without user intervention.

The correction method according to the present embodiment may be applied to various substrate processing results as an example of film formation results, measured with various measuring devices, such as film thickness measured with a film thickness gauge and RI measured with a reflectometer, the measured results exhibiting a distribution.

According to the correction method of the present embodiment, recipe optimization may be performed using output data after the removal and interpolation of outliers. Examples of recipe optimization may include heater temperature settings, film formation time, gas flow rate, APC opening degree (pressure control), etc. However, it is not limited to these parameters, and the output data may be used to optimize process conditions that affect the substrate processing results. Recipe optimization may be performed automatically for each substrate processing, both during the evaluation and mass production of the substrate processing apparatus 10.

Further, in the correction method according to the present embodiment, there are no restrictions on the arrangement of measurement points. For example, measurement points do not need to be positioned in a concentric circle shape as illustrated in FIGS. 7A and 7B. Further, a measurement target for the removal and interpolation of outliers is not limited to film thickness but may be a refractive index (RI), etc. Further, if the substrate processing apparatus 10 is an etching apparatus, a measurement target may be the inclination (tilt angle) of an etching shape, critical dimension (CD), etc.

In the correction method according to the present embodiment, outliers are determined based on the weight value for each measurement point. Since the weight value for each measurement point is determined from an estimated film thickness value at that measurement point, etc., outlier detection is possible even when the difference in the measured film thickness value from nearby measurement points is less than a standard deviation. Further, the correction method according to the present embodiment does not have any restrictions such as the substrate processing results following a normal distribution.

As described above, the correction method according to the present embodiment allows for the automatic correction of the results of substrate processing at a plurality of measurement points on a substrate.

The substrate processing apparatus of the present disclosure may be applied to any type of apparatuses such as atomic layer deposition (ALD), capacitively coupled plasma (CCP), inductively coupled plasma (ICP), radial line slot antenna (RLSA), electron cyclotron resonance plasma (ECR), and helicon wave plasma (HWP) apparatuses.

Further, the substrate processing apparatus of the present disclosure is not limited to a substrate processing apparatus using a plasma, but may also be an apparatus that processes a substrate without using a plasma.

According to one aspect, it is possible to automatically correct the results of substrate processing at a plurality of measurement points on a substrate.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An information processing apparatus comprising:

an input circuitry configured to input positional information regarding a plurality of measurement points on a substrate and a plurality of measured values indicating a substrate processing result at each of the plurality of measurement points;

a calculation circuitry configured to calculate a plurality of estimated values for the substrate processing result at each of the plurality of measurement points selected from the positional information regarding the plurality of measurement points, using a local linear regression method;

a determination circuitry configured to determine, as an outlier, a measured value at a measurement point where an absolute value of a difference between the measured value and the estimated value at each of the plurality of selected measurement points deviates from a threshold set in advance; and a correction circuitry configured to correct the measured value at the measurement point determined as the outlier, wherein the calculation circuitry is configured to recalculate the plurality of estimated values for the substrate processing result of each of the plurality of selected measurement points of the substrate, excluding the measurement point where the absolute value of the difference between the measured value and the estimated value deviates from the threshold, and the determination circuitry is configured to determine the outlier based on the absolute value of the difference between the measured value and the recalculated estimated value at each of the plurality of selected measurement points of the substrate, excluding the measurement point deviating from the threshold.

2. The information processing apparatus according to claim 1, wherein the correction circuitry is configured to correct the measured value by replacing the measured value at the measurement point determined as the outlier with the estimated value at the measurement point.

3. The information processing apparatus according to claim 1, wherein the calculation circuitry is configured to repeat recalculation of the estimated values a number of times set in advance as a parameter setting, and wherein the determination circuitry is configured to repeat determination of the outlier a preset number of times as the parameter setting.

4. The information processing apparatus according to claim 1, wherein the calculation circuitry is configured to repeat recalculation of the estimated value until there is no measurement point determined as the outlier, and wherein the determination circuitry is configured to repeat determination of the outlier until there is no measurement point determined as the outlier.

5. The information processing apparatus according to claim 1, further comprising a recipe optimization circuitry configured to optimize a recipe that sets a substrate processing sequence based on the measured values at the plurality of measurement points including the corrected measured value.

6. The information processing apparatus according to claim 1, wherein the measured value is a film thickness or a refractive index of a film formed on the substrate.

7. The information processing apparatus according to claim 1, wherein the calculation circuitry is configured to determine a weight value for each of the plurality of selected measurement points based on the difference between the measured value and the estimated value, and to recalculate the plurality of estimated values using the local linear regression method based on the weight value, and one or more measurement points are excluded from the calculation according to the weight value.

8. The information processing apparatus according to claim 7, wherein the calculation circuitry is configured to set a weight value of zero for each measurement point when the absolute value of the difference between the measured value and the estimated value exceeds the threshold, to recalculate the estimated values using the local linear regression method based only on measurement points having a weight value other than zero, and to repeat setting the weight value for each measurement point and recalculating the estimated values based on the weight values, and the determination circuitry is configured to determine, as the outlier, the measured value at a measurement point having the weight value of zero.

9. A correction method executed by an information processing apparatus, the method comprising:

inputting positional information regarding a plurality of measurement points on a substrate and a plurality of measured values indicating a substrate processing result at each of the plurality of measurement points;

calculating a plurality of estimated values for the substrate processing result at each of the plurality of measurement points selected from the input positional information regarding the plurality of measurement points using a local linear regression method;

determining, as an outlier, a measured value at a measurement point where an absolute value of a difference between the measured value and the estimated value at each of the plurality of selected measurement points deviates from a threshold set in advance; and correcting the measured value at the measurement point determined as the outlier, wherein the calculating of the plurality of estimated values includes recalculating the plurality of estimated values for the substrate processing result of each of the plurality of selected measurement points of the substrate, excluding the measurement point where the absolute value of the difference between the measured value and the estimated value deviates from the threshold, and the determining of the outlier includes determining the outlier based on the absolute value of the difference between the measured value and the recalculated estimated value at each of the plurality of selected measurement points of the substrate, excluding the measurement point deviating from the threshold.

* * * * *